(12) United States Patent
Goodling

(10) Patent No.: US 11,401,728 B1
(45) Date of Patent: Aug. 2, 2022

(54) SOLAR UMBRELLA

(71) Applicant: Jason Goodling, York Haven, PA (US)

(72) Inventor: Jason Goodling, York Haven, PA (US)

( * ) Notice: Subject to any disclaimer, the term of this patent is extended or adjusted under 35 U.S.C. 154(b) by 0 days.

(21) Appl. No.: 17/158,138

(22) Filed: Jan. 26, 2021

(51) Int. Cl.
| *A45B 23/00* | (2006.01) |
| *E04H 15/14* | (2006.01) |
| *E04H 12/22* | (2006.01) |
| *H02S 20/10* | (2014.01) |
| *H02S 30/20* | (2014.01) |
| *H02S 40/42* | (2014.01) |
| *H02J 7/35* | (2006.01) |
| *H02S 40/38* | (2014.01) |

(52) U.S. Cl.
CPC ............ *E04H 15/14* (2013.01); *A45B 23/00* (2013.01); *E04H 12/2215* (2013.01); *H02J 7/35* (2013.01); *H02S 20/10* (2014.12); *H02S 30/20* (2014.12); *H02S 40/38* (2014.12); *H02S 40/425* (2014.12); *A45B 2023/0012* (2013.01); *A45B 2200/1027* (2013.01); *A45B 2200/1036* (2013.01)

(58) Field of Classification Search
CPC .............. A45B 2200/1027; A45B 2200/1036
See application file for complete search history.

(56) References Cited

U.S. PATENT DOCUMENTS

| 5,172,711 | A | * | 12/1992 | Mueller | ................... | A45B 3/00 |
| | | | | | | 135/16 |
| 5,273,062 | A | * | 12/1993 | Mozdzanowski | ........ | A45B 3/00 |
| | | | | | | 135/16 |
| 5,349,975 | A | | 9/1994 | Valdner | | |
| 6,598,990 | B2 | * | 7/2003 | Li | ............................. | A45B 3/04 |
| | | | | | | 362/102 |
| 6,612,713 | B1 | * | 9/2003 | Kuelbs | ..................... | A45B 3/04 |
| | | | | | | 362/102 |
| 8,104,491 | B2 | * | 1/2012 | Li | ........................... | H02S 30/20 |
| | | | | | | 135/16 |
| 8,375,966 | B2 | | 2/2013 | Kuelbs | | |
| 8,695,614 | B2 | * | 4/2014 | Chaimovski | ........... | E04H 15/58 |
| | | | | | | 135/16 |
| 8,851,343 | B1 | * | 10/2014 | Evans | .................... | A45B 11/02 |
| | | | | | | 224/190 |
| 9,088,181 | B2 | | 7/2015 | Akin | | |
| D749,313 | S | | 2/2016 | Akin | | |
| 9,820,540 | B2 | * | 11/2017 | Pan | ...................... | A45B 25/143 |
| 9,912,286 | B2 | * | 3/2018 | Rossi | ..................... | H02S 30/20 |
| 10,051,931 | B2 | | 8/2018 | Zadie | | |
| 10,302,259 | B2 | * | 5/2019 | Heilbrun | .................. | F21L 4/08 |
| 2004/0084071 | A1 | * | 5/2004 | Gray | ........................ | A45B 3/00 |
| | | | | | | 135/16 |
| 2005/0161067 | A1 | * | 7/2005 | Hollins | .................. | A45B 23/00 |
| | | | | | | 135/16 |
| 2008/0092936 | A1 | | 4/2008 | Carabillo | | |
| 2016/0340926 | A1 | | 11/2016 | Barbret | | |

FOREIGN PATENT DOCUMENTS

WO 2018195262 10/2018

* cited by examiner

*Primary Examiner* — Noah Chandler Hawk

(57) ABSTRACT

The solar umbrella forms a temporary shelter. The solar umbrella creates a protected space for use during outdoor activities. The solar umbrella incorporates an umbrella structure, a control circuit, and a cooling structure. The cooling structure and the control circuit attach to the umbrella structure. The umbrella structure forms the protected space. The cooling structure generates an air flow within the protected space. The control circuit provides electric energy used to operate: a) the cooling structure; and, b) externally provided electrically powered devices.

12 Claims, 7 Drawing Sheets

SOLAR UMBRELLA

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of umbrellas including umbrellas combined with other objects with means for generating solar energy. (A45B2200/1027)

SUMMARY OF INVENTION

The solar umbrella forms a temporary shelter. The solar umbrella creates a protected space for use during outdoor activities. The solar umbrella comprises an umbrella structure, a control circuit, and a cooling structure. The cooling structure and the control circuit attach to the umbrella structure. The umbrella structure forms the protected space. The cooling structure generates an air flow within the protected space. The control circuit provides electric energy used to operate: a) the cooling structure; and, b) externally provided electrically powered devices.

These together with additional objects, features and advantages of the solar umbrella will be readily apparent to those of ordinary skill in the art upon reading the following detailed description of the presently preferred, but nonetheless illustrative, embodiments when taken in conjunction with the accompanying drawings.

In this respect, before explaining the current embodiments of the solar umbrella in detail, it is to be understood that the solar umbrella is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the solar umbrella.

It is therefore important that the claims be regarded as including such equivalent construction insofar as they do not depart from the spirit and scope of the solar umbrella. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
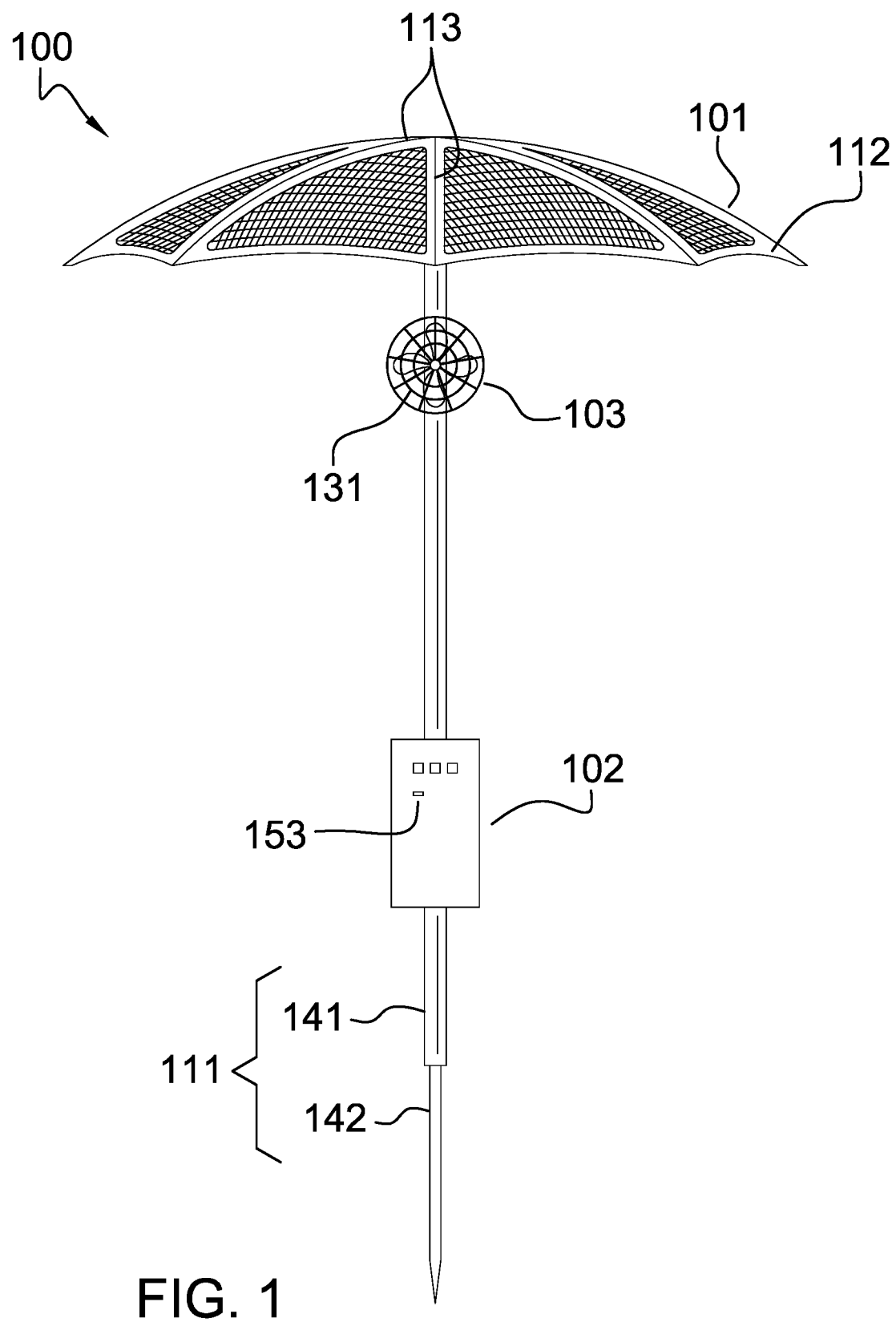
FIG. 1 is a side view of an embodiment of the disclosure.
Figure 2:
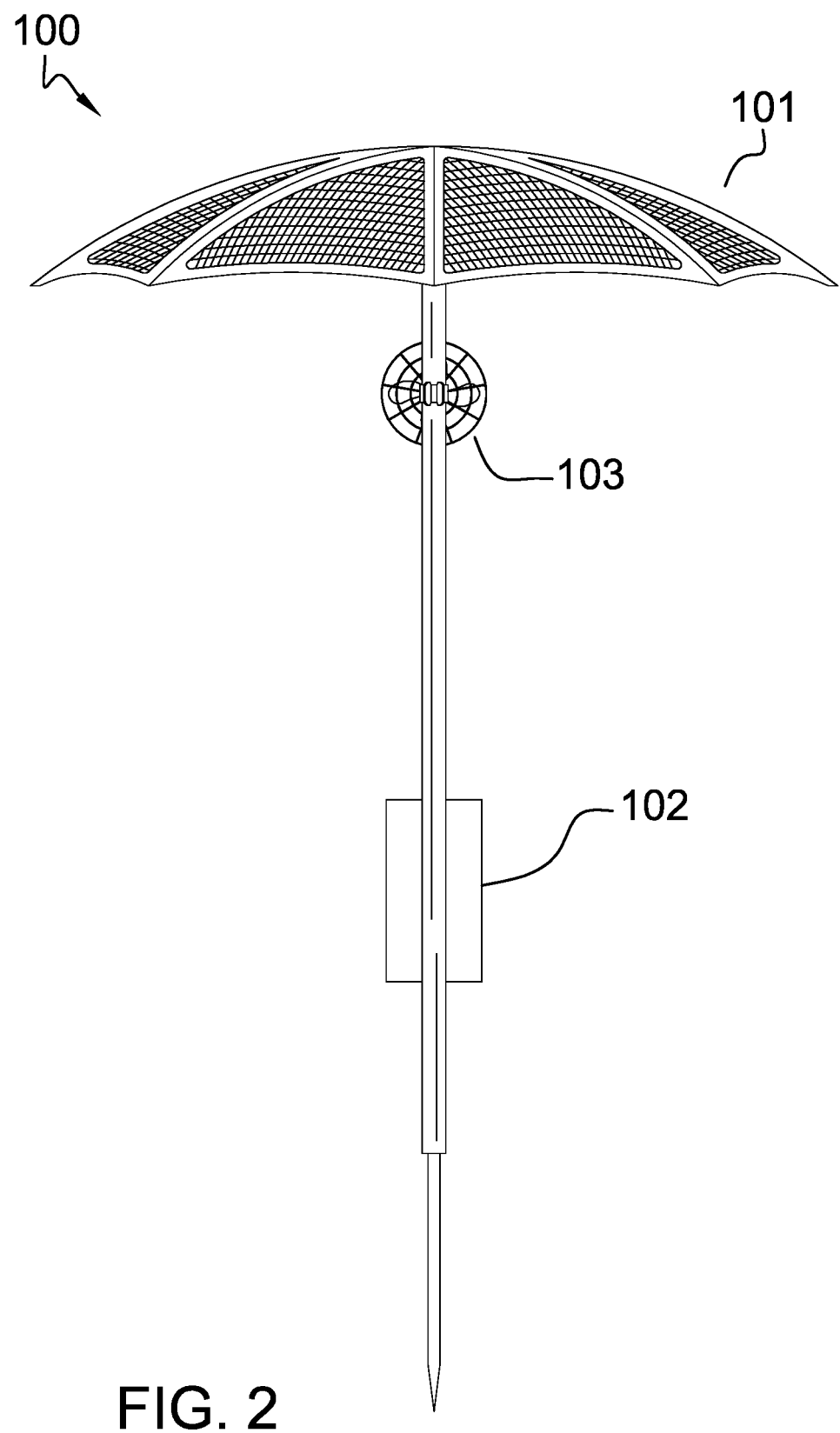
FIG. 2 is a reverse side view of an embodiment of the disclosure.
Figure 3:
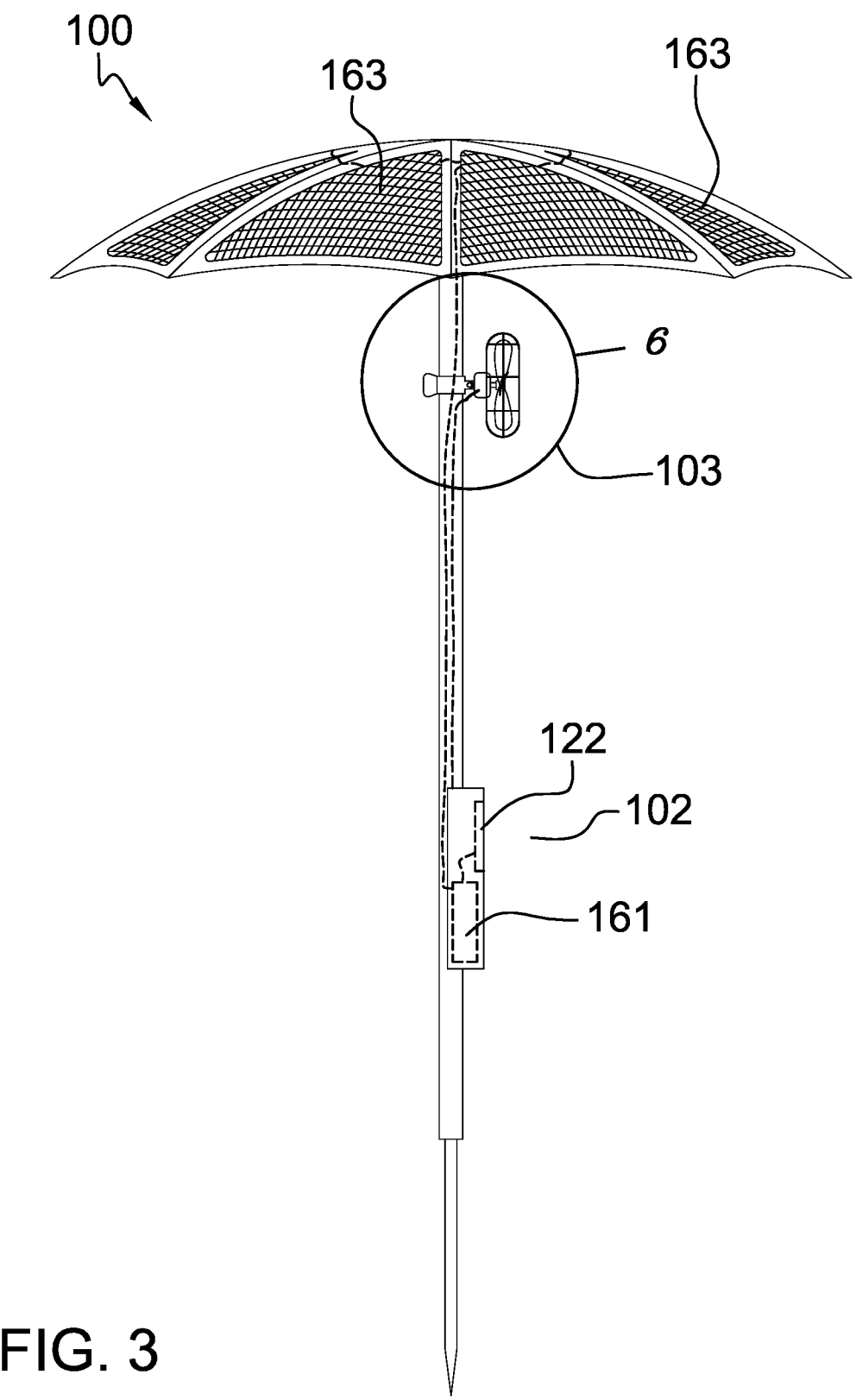
FIG. 3 is a rotated side view of an embodiment of the disclosure.
Figure 4:
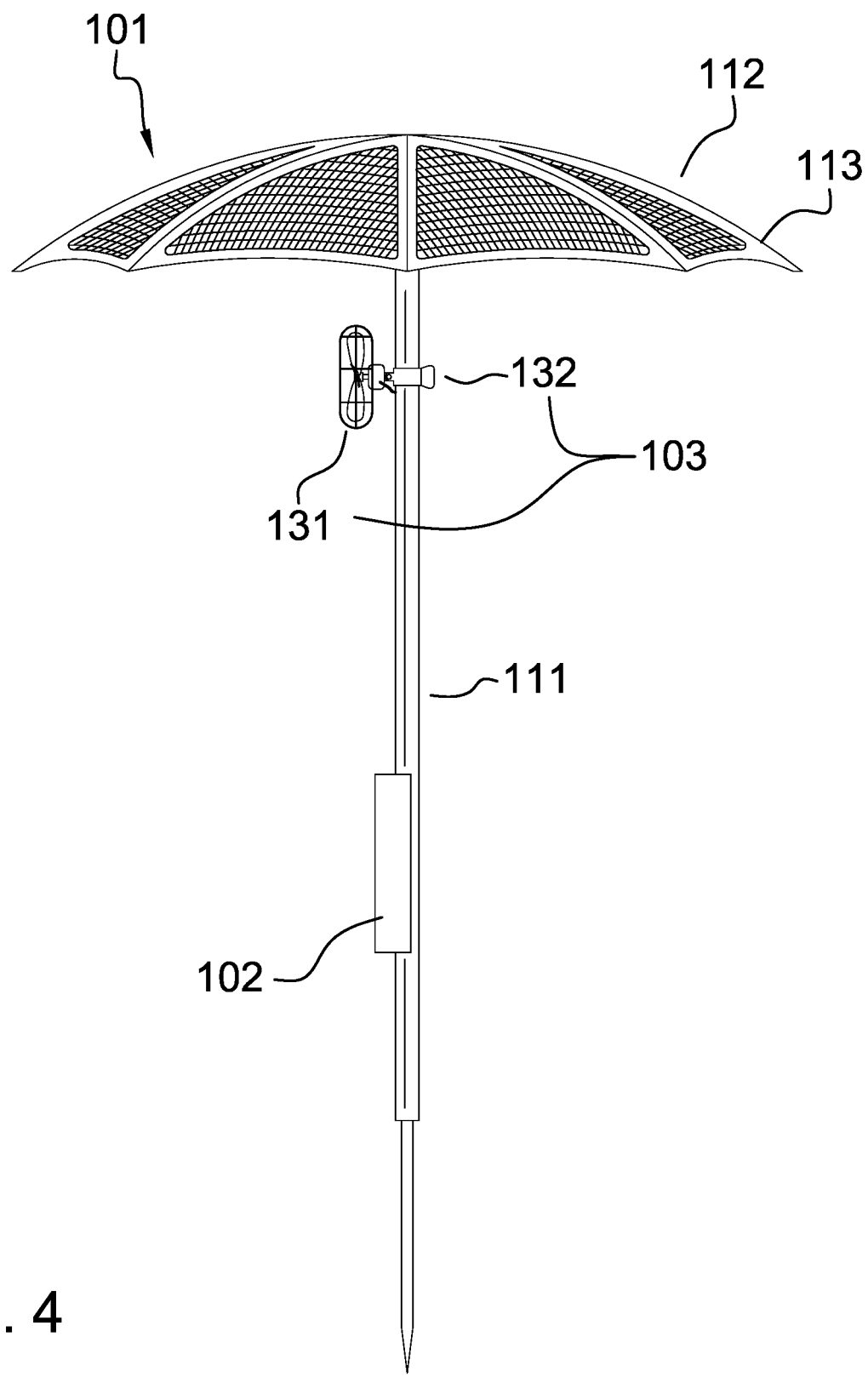
FIG. 4 is a reverse rotated side view of an embodiment of the disclosure.
Figure 5:
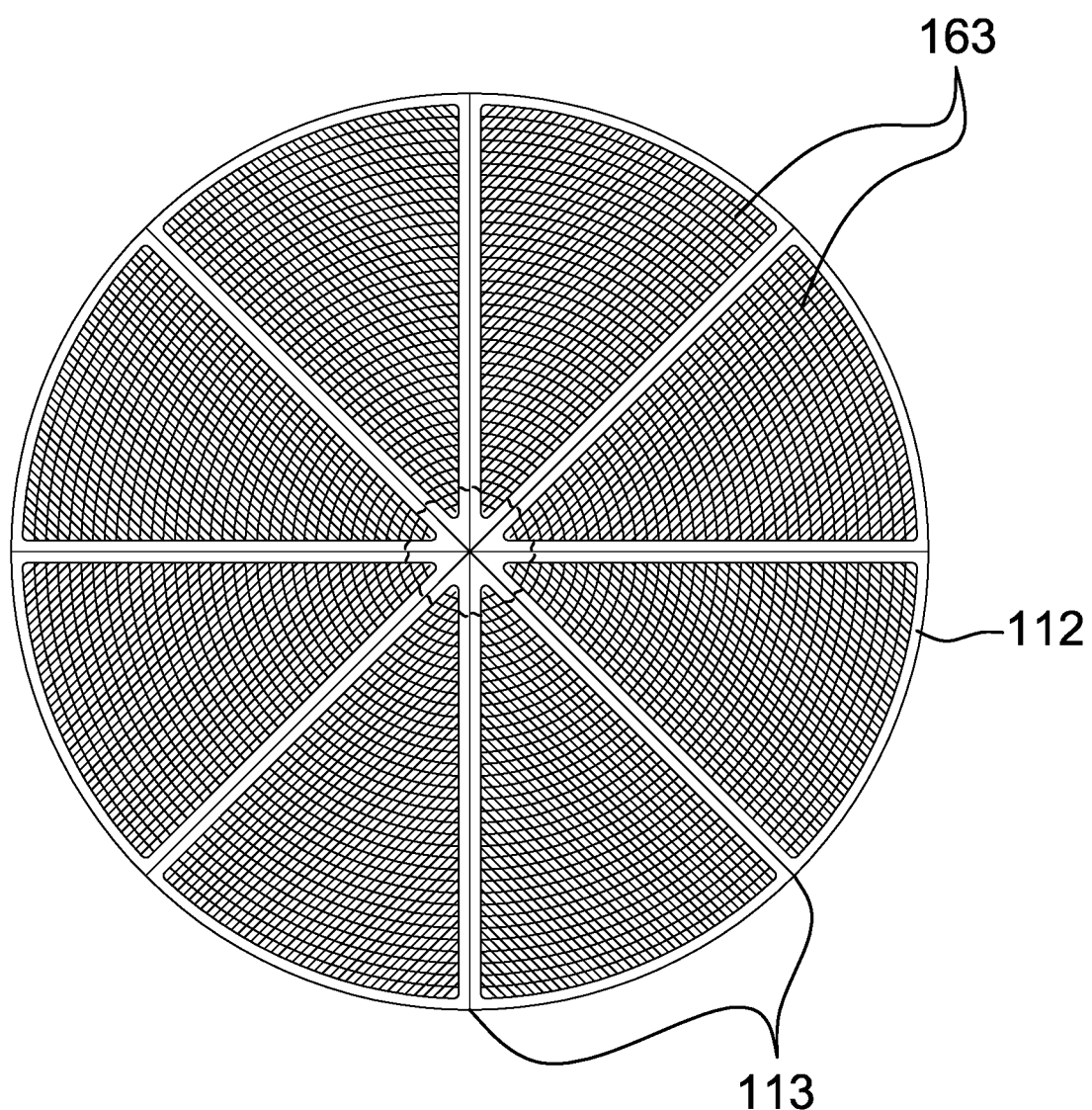
FIG. 5 is a top view of an embodiment of the disclosure.
Figure 6:
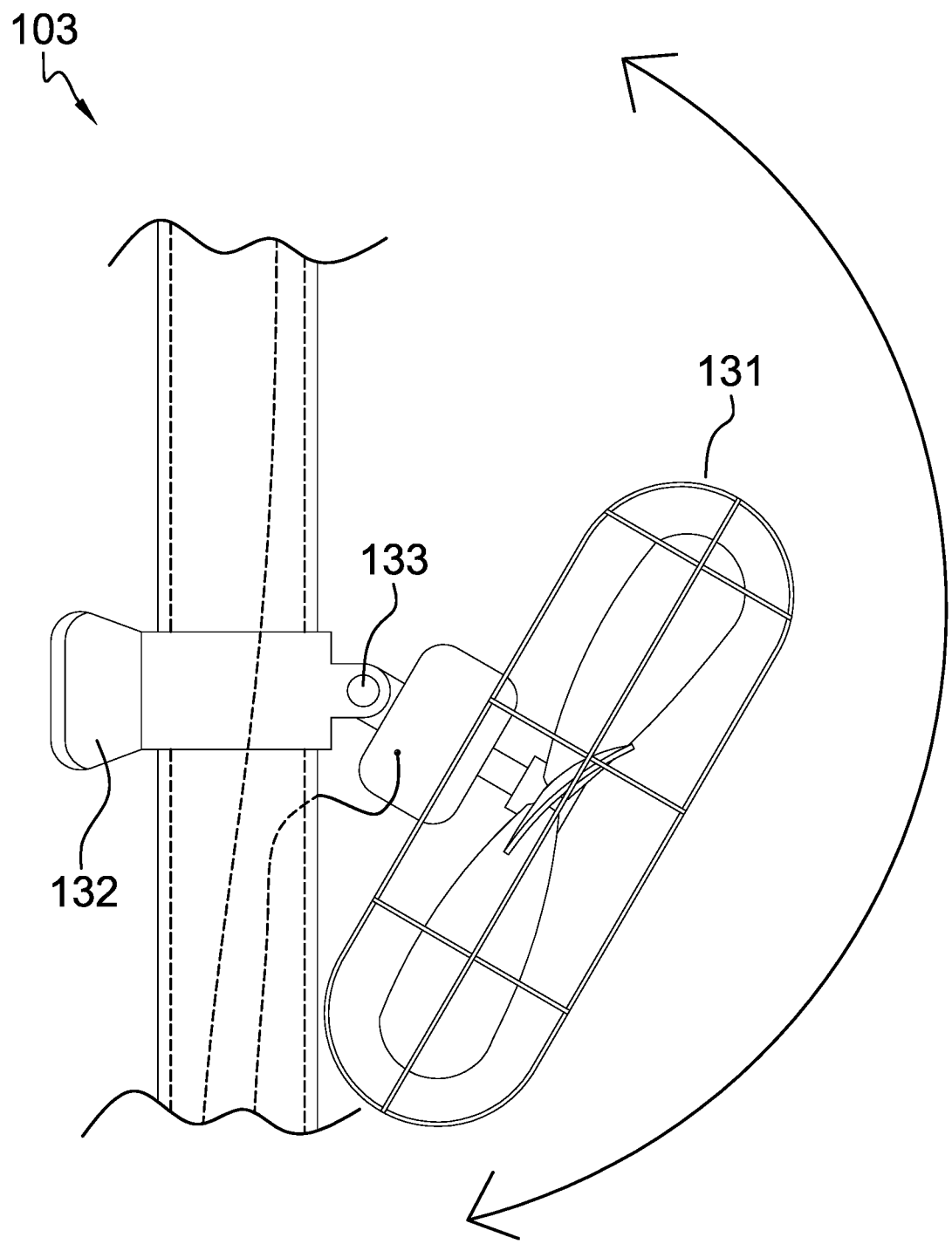
FIG. 6 is a detail view of an embodiment of the disclosure.
Figure 7:
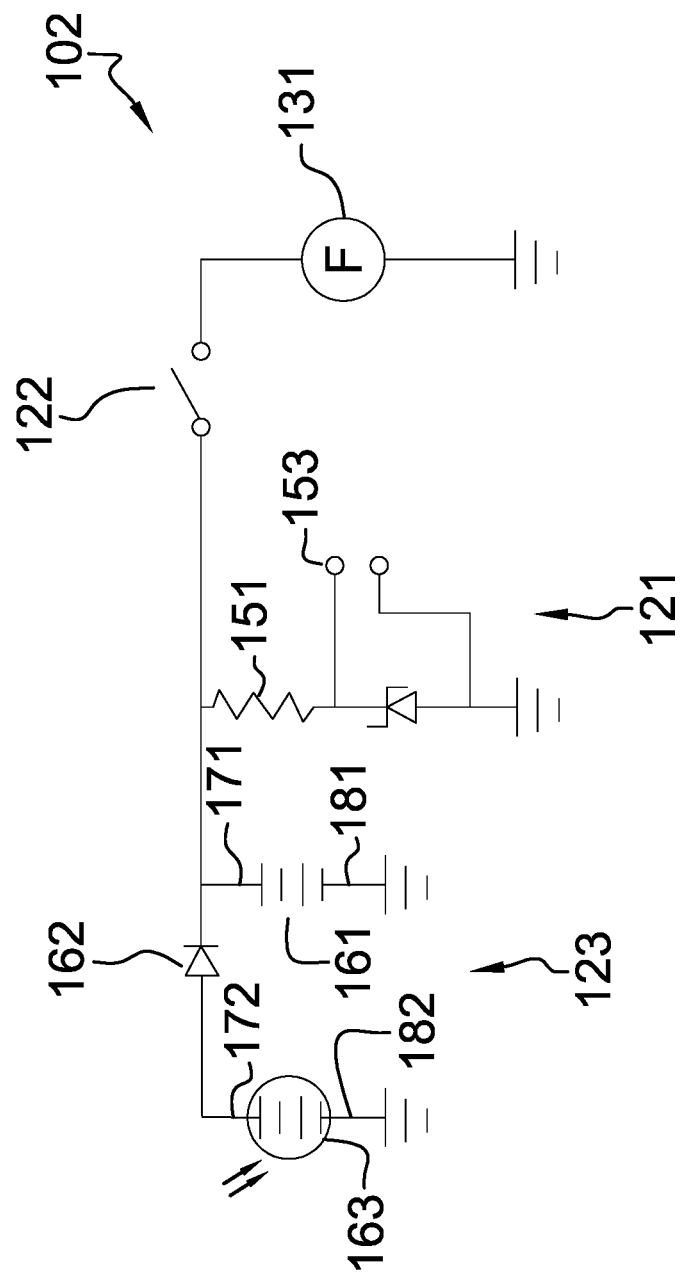
FIG. 7 is a schematic view of an embodiment of the disclosure.

Detailed reference will now be made to one or more potential embodiments of the disclosure, which are illustrated in FIGS. 1 through 7.

The solar umbrella 100 (hereinafter invention) forms a temporary shelter. The invention 100 creates a protected space for use during outdoor activities. The invention 100 comprises an umbrella structure 101, a control circuit 102, and a cooling structure 103. The cooling structure 103 and the control circuit 102 attach to the umbrella structure 101. The umbrella structure 101 forms the protected space. The cooling structure 103 generates an air flow within the protected space. The control circuit 102 provides electrical energy used to operate: a) the cooling structure 103; and, b) externally provided electrically powered devices.

The umbrella structure 101 is a mechanical structure. The umbrella structure 101 forms a protected space. The umbrella structure 101 forms a barrier that encloses the superior boundary of the protected space. The umbrella structure 101 is a collapsible structure. The collapsible structure is defined elsewhere in this disclosure. The umbrella structure 101 comprises a center rod 111, a canopy 112, and a plurality of ribs 113.

The center rod 111 is an extension structure. The center rod 111 anchors the canopy 112 and the plurality of ribs 113 into the ground. The center rod 111 elevates the canopy 112 and the plurality of ribs 113 above the ground. The center rod 111 comprises a stanchion 141 and a stake 142.

The stanchion 141 is a prism-shaped structure. The stanchion 141 attaches to the stake 142 to form a composite prism structure. The stanchion 141 forms an extension structure that elevates the canopy 112 of the umbrella structure 101 above the ground in which the stake 142 anchors the umbrella structure 101. The stake 142 is a spit shaped structure. The stake 142 is driven into the ground to anchor the umbrella structure 101 into a fixed position.

The canopy 112 is a sheeting structure. The canopy 112 forms the superior barrier of the protected space formed by the umbrella structure 101. The canopy 112 forms a fluid impermeable barrier. The canopy 112 forms an opaque barrier. The canopy 112 forms the surface on which the photovoltaic cell 163 of the control circuit 102 attaches.

The plurality of ribs 113 form a load bearing structure. Each of the plurality of ribs 113 attaches to the stanchion 141 of the center rod 111. Each of the plurality of ribs 113 attaches to the stanchion 141 such that the plurality of ribs 113 rotates between an open position and a closed position. The plurality of ribs 113 attaches the canopy 112 to the center rod 111 such that the canopy 112 also rotates between an open position and a closed position. The plurality of ribs 113 collapses into the closed position to prepare the umbrella structure 101 for storage. The plurality of ribs 113 deploys into the open position to create the protected space formed by the umbrella structure 101.

The plurality of ribs 113 comprises a runner and a plurality of stretchers. The plurality of ribs 113 attaches to the center rod 111 using the runner and the plurality of stretchers. The runner and the plurality of stretchers are defined elsewhere in this disclosure.

The control circuit 102 is an electric circuit. The control circuit 102 provides the electric energy necessary to operate the cooling structure 103. The control circuit 102 provides the electric energy used to operate an externally provided electrically powered device. By externally provided is meant that the externally provided electrically powered device is beyond the scope of this disclosure. The control circuit 102 is an independently powered electric circuit. By independently powered is meant that the control circuit 102 can provide electric energy to operate the cooling structure 103 and the externally provided electrically powered devices without an electrical connection to an external power source.

The control circuit 102 comprises a power output circuit 121, a master switch 122, and a power circuit 123. The power output circuit 121, the master switch 122, and the power circuit 123 are electrically interconnected.

The power output circuit 121 is an electric circuit. The power output circuit 121 provides a port that presents an electric voltage suitable for use in powering and charging an externally provided electrically powered device. The power output circuit 121 forms a series electric circuit with the power circuit 123. The power output circuit 121 comprises a limit resistor 151, a Zener diode 152, and an output port 153. The limit resistor 151, the Zener diode 152, and the output port 153 are electrically interconnected.

The limit resistor 151 is an electric circuit element. The limit resistor 151 is defined elsewhere in this disclosure. The limit resistor 151 limits the flow of electricity through the Zener diode 152. The Zener diode 152 is an electric circuit element. The Zener diode 152 presents a relatively constant voltage, known as a Zener voltage, to the output port 153. The output port 153 is an electric port. The output port 153 presents as its output voltage the Zener voltage of the Zener diode 152. The output port 153 transmits the electric energy received from the power circuit 123 to the externally provided electrically powered device. In the first potential embodiment of the disclosure, the output port 153 is a USB compatible port.

The master switch 122 is an electric switch. The master switch 122 is a maintained switch. The master switch 122 is wired in series with the fan 131 such that the master switch 122 controls the flow of electric energy from the power circuit 123 into the fan 131. The circuit formed by the combination of the master switch 122 and the fan 131 forms a parallel circuit with the power output circuit 121.

The power circuit 123 is an electrical circuit. The power circuit 123 powers the operation of the control circuit 102. The power circuit 123 is an electrochemical device. The power circuit 123 converts chemical potential energy into the electrical energy required to power the control circuit 102. The power circuit 123 comprises a battery 161, a diode 162, and a photovoltaic cell 163. The battery 161, the diode 162, and the photovoltaic cell 163 are electrically interconnected. The battery 161 further comprises a first positive terminal 171 and a first negative terminal 181. The photovoltaic cell 163 further comprises a second positive terminal 172 and a second negative terminal 182.

The battery 161 is an electrochemical device. The battery 161 converts chemical potential energy into the electrical energy used to power the control circuit 102. The battery 161 is a commercially available rechargeable battery 161. The photovoltaic cell 163 is an electrical device that converts light into electrical energy. The chemical energy stored within the rechargeable battery 161 is further renewed and restored through the use of the photovoltaic cell 163. The photovoltaic cell 163 is directly wired to the battery 161. The photovoltaic cell 163 is an electrical circuit that reverses the polarity of the rechargeable battery 161 and provides the energy necessary to reverse the chemical processes that the rechargeable battery 161 initially used to generate the electrical energy. This reversal of the chemical process creates a chemical potential energy that will later be used by the rechargeable battery 161 to generate electricity.

The diode 162 is an electrical device that allows current to flow in only one direction. The diode 162 installs between the rechargeable battery 161 and the photovoltaic cell 163 such that electricity will not flow from the first positive terminal 171 of the rechargeable battery 161 into the second positive terminal 172 of the photovoltaic cell 163. The photovoltaic cell 163 is defined elsewhere in this disclosure.

The photovoltaic cell 163 mounts on the superior surface of the canopy 112. In the first potential embodiment of the disclosure, the applicant prefers the use of one or more flexible solar panels as the photovoltaic cell 163.

The cooling structure 103 is an electromechanical device. The cooling structure 103 is an electrically powered device. The cooling structure 103 electrically connects to the control circuit 102. The cooling structure 103 draws electric energy for operation from the control circuit 102. The cooling structure 103 generates an air flow through the protected space formed by the umbrella structure 101. The cooling structure 103 comprises a fan 131 and a fan 131 clip 132.

The fan 131 is an electrically powered device. The fan 131 physically generates the air flow through the protected space formed by the umbrella structure 101. The fan 131 clip 132 is a mechanical structure. The fan 131 clip 132 is a spring loaded structure. The fan 131 clip 132 removably attaches the fan 131 to the stanchion 141 of the center rod 111 of the umbrella structure 101. The fan 131 clip 132 further comprises a universal joint 133. The universal joint 133 is a locking universal joint 133. The universal joint 133 is defined elsewhere in this disclosure. The universal joint 133 physically attaches the fan 131 to the fan 131 clip 132 such that the fan 131 rotates relative to the stanchion 141 of the center rod 111. The universal joint 133 allows for the adjustment of the direction of the air flow through the protected space formed by the umbrella structure 101.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anchor: As used in this disclosure, anchor means to hold an object firmly or securely.

Anchor Point: As used in this disclosure, an anchor point is a location to which a first object can be securely attached to a second object.

Apex: As used in this disclosure, an apex is a vertex that forms an extreme or solitary point of an object.

Barrier: As used in this disclosure, a barrier is a physical obstacle that forms a boundary between a first space and a second space. The barrier prevents the passage of an object between the first space and the second space.

Battery: As used in this disclosure, a battery is a chemical device consisting of one or more cells, in which chemical energy is converted into electricity and used as a source of power. Batteries are commonly defined with a positive terminal and a negative terminal.

Brink: As used in this disclosure, a brink refers to the edge or line formed by the intersection of a first plane or surface and a second plane or surface wherein a cant exists between the first plane or surface and the second plane or surface.

Canopy: As used in this disclosure, a canopy is a cover, usually made of fabric that is placed above an area and creates a protected space within which people or objects are protected from the environment.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Clip: As used in this disclosure, a clip is a fastener that attaches to an object by gripping or clasping the object. A clip is typically spring loaded.

Closed Position: As used in this disclosure, a closed position refers to a movable barrier structure that is in an orientation that minimizes the exterior surface area presented by the movable barrier structure. The closed position is often referred to as an object being "closed."

Open Position: As used in this disclosure, an open position refers to a movable barrier structure that is in an orientation that presents an exterior surface area of the movable barrier structure that is greater than the closed position. The open position is often referred to as an object being "open."

Collapsible: As used in this disclosure, the term collapsible refers to an object that is configured such that the volume of the object is adjustable. By volume is meant the volume of the perimetrical boundary that contains the object. The verb collapse means that the volume of the object is adjusted from a larger volume to a smaller volume. The verbs expand and deploy mean that the volume of the object is adjusted from a smaller volume to a larger volume.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Control Circuit: As used in this disclosure, a control circuit is an electrical circuit that manages and regulates the behavior or operation of a device.

Correspond: As used in this disclosure, the term correspond is used as a comparison between two or more objects wherein one or more properties shared by the two or more objects match, agree, or align within acceptable manufacturing tolerances.

Diode: As used in this disclosure, a diode is a two terminal semiconductor device that allows current flow in only one direction. The two terminals are called the anode and the cathode. Electric current is allowed to pass from the anode to the cathode.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Extension Structure: As used in this disclosure, an extension structure is an inert physical structure that is used to extend or bridge the reach between any two objects.

External Power Source: As used in this disclosure, an external power source is a source of the energy that is externally provided to enable the operation of the present disclosure. Examples of external power sources include, but are not limited to, electrical power sources and compressed air sources.

Fan: As used in this disclosure, a fan is a pump that moves a gas. The first potential embodiment of this disclosure assumes that the fan is a mechanical device with rotating blades that is used to create a flow or current of a gas.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Ground: As used in this disclosure, the ground is a solid supporting surface formed by the Earth. The term level ground means that the supporting surface formed by the ground is roughly perpendicular to the force of gravity.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Limit Resistor: As used in this disclosure, a limit resistor is an electrical resistor that is used to limit the flow of electric current through an electrical circuit.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Lock: As used in this disclosure, a lock is a releasable fastening device that secures a rotating mechanical device into a fixed position.

Maintained Switch: A used in this disclosure, a maintained switch is a switch that maintains the position that was set in the most recent switch actuation. A maintained switch works in an opposite manner to a momentary switch.

N-gon: As used in this disclosure, an N-gon is a regular polygon with N sides wherein N is a positive integer number greater than 2.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Opaque: As used in this disclosure, opaque refers to an object or material that prevents the passage of radiation through the object or material.

Orientation: As used in this disclosure, orientation refers to the positioning of a first object relative to: 1) a second object; or, 2) a fixed position, location, or direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan is are open.

Parallel Circuit: As used in this disclosure, a parallel circuit refers to a method of electrically connecting a plurality of circuit elements to a voltage source. In a parallel circuit each circuit element receives a voltage equal to the full voltage produced by the voltage source.

Perimeter: As used in this disclosure, a perimeter is one or more curved or straight lines that bounds an enclosed area on a plane or surface. The perimeter of a circle is commonly referred to as a circumference.

Perimetrical Boundary: As used in this disclosure, a perimetrical boundary is a hypothetical rectangular block that contains an object. Specifically, the rectangular block selected to be the perimetrical boundary is the rectangular block with the minimum volume that fully contains the object. In a two-dimensional structure, the perimetrical boundary is the rectangle with the minimum surface area.

Permanent: As used in this disclosure, the term permanent refers to a fundamental state, condition or location of an object, process, or arrangement that is not subject to, or expected to be, changed. A perpetual object refers to a permanent object that is expected to last over an unlimited period of time. A building such as a house or a skyscraper would be considered permanent. An ocean would be considered perpetual.

Photoelectric: As used in this disclosure, photoelectric is an adjective used to describe an electronic component in which the performance of the electronic component is modified by light. Typical photoelectric devices include, but are not limited to, photoelectric transistors, photoelectric diodes, and photoelectric resistors.

Photovoltaic Cell: As used in this disclosure, a photovoltaic cell is a photoelectric device that directly converts light energy into electrical energy.

Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a negative space within which an object is stored. The protected space is enclosed by a barrier structure that: a) prevents damage to the object contained within the protected space; or, b) maintains an environment suitable within the protected space that is appropriate for the object.

Pyramid: As used in this disclosure, a pyramid is a three-dimensional shape that comprises a base formed in the shape of an N-gon (wherein N is an integer) with N triangular faces that rise from the base to converge at a point above the base. The center axis of a pyramid is the line drawn from the vertex where the N faces meet to the center of the N-gon base. The center axis of a right pyramid is perpendicular to the N-gon base. Pyramids can be further formed with circular or elliptical bases which are commonly referred to as a cone or an elliptical pyramid respectively. A pyramid is defined with a base, an apex, and a lateral face. The base is the N-gon shaped base described above. The apex is the vertex that defines the center axis. The lateral face is formed from the N triangular faces described above.

Reach: As used in this disclosure, reach refers to a span of distance between any two objects.

Resistance: As used in this disclosure, resistance refers to the opposition provided by an electrical circuit (or circuit element) to the electrical current created by a DC voltage is presented across the electrical circuit (or circuit element). The term impedance is often used for resistance when referring to an AC voltage that is presented across the electrical circuit (or circuit element).

Resistor: As used in this disclosure, a resistor is a well-known and commonly available electrical device that presents a resistance that inhibits the flow of electricity through an electric circuit. Within an electric circuit processing alternating currents, the resistor will not affect the phase of the alternating current. A current flowing through a resistor will create a voltage across the terminals of the resistor.

Rib: As used in this disclosure, a rib refers to one of a plurality of shafts that are used to form the framework of an umbrella upon which the canopy of the umbrella is attached. The framework formed by this plurality of ribs and opened and closed using a plurality of stretchers attached to the runner of the umbrella.

Runner: As used in this disclosure, a runner is a component of an umbrella that fits over the center post of the umbrella. Stretchers are used to connect the ribs of the umbrella to the runner which in turn connects the runner to the center post. By raising the runner, the stretchers expand the ribs to create a structure upon which the canopy of the umbrella is placed.

Series Circuit: As used in this disclosure, a series circuit refers to a method of electrically connecting a plurality of circuit elements to a voltage source. In a series circuit, the proportion of the voltage received by each individual circuit element is divided proportionally between the plurality circuit elements based on the resistance (or impedance) of each circuit element relative to the total resistance of the plurality of circuit elements. The series circuit forms a linear or loop structure often referred to as a daisy chain.

Sharp: As used in this disclosure, the term sharp refers to an apex or a brink that is formed in a first structure that is capable of puncturing or cutting a second structure.

Sheeting: As used in this disclosure, a sheeting is a material, such as a paper, textile, a plastic, or a metal foil, in the form of a thin flexible layer or layers. The sheeting forms a disk structure. The two surfaces of the sheeting with the greatest surface area are called the faces of the sheeting.

Spit: As used in this disclosure, a spit refers to a composite prism structure formed by the combination of a prism and a pyramid such that the apex of the pyramid forms a point capable of pushing through the surface of a second structure.

Stake: As used in this disclosure, a stake is a spit that is driven into a horizontal surface, such as the ground, to serve as an anchor point.

Stanchion: As used in this disclosure, a stanchion refers to a vertically oriented prism-shaped pole, post, or support.

Stretcher: As used in this disclosure, a stretcher is a shaft that attaches a rib of an umbrella to the runner of the umbrella. Each of the plurality of stretcher of an umbrella are used to expand and contract the framework formed by the umbrella ribs to open and close the umbrella.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Temporary: As used in this disclosure, the term temporary refers to a state, condition or location of an object, process, or arrangement that is intended to last for a limited period of time. The term temporary is the opposite of permanent. The term transient refers to a temporary state or condition of an object that degrades over time. In physical processes, the term transient tends to imply a short period of time.

Umbrella: As used in this disclosure, an umbrella is a device used for protection against the weather comprising a (typically circular) canopy made of a textile or sheeting that is mounted on a folding metal frame that is supported by a central rod.

Universal Joint: As used in this disclosure, a universal joint is a method of joining a first shaft to as second shaft such that the center axis of the first shaft and is offset from the center axis of the second shaft. The offset angle is adjustable. When a universal joint is formed with a locking mechanism, a universal joint can further be used to lock the offset angle, often referred to as a cant, between the first shaft and the second shaft into a fixed position. Universal joints are often used to transfer rotation from the first shaft to rotate the second shaft.

USB: As used in this disclosure, USB is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors. A USB cable refers to a cable that: 1) is terminated with USB connectors; and, 2) that meets the data transmission standards of the USB standard.

Vertex: As used in this disclosure, a vertex (plural vertices) is an angle that is formed by two lines (or a plurality of surfaces) that form a point. Vertices are commonly found in polygons, prisms and pyramids.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Zener Diode: As used in this disclosure, a Zener diode is a two terminal electrical device that is used to generate a known voltage that is relatively independent of variations in the voltage applied to the Zener diode. The known voltage is referred to as the Zener voltage.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A solar umbrella comprising
an umbrella structure, a control circuit, and a cooling structure;
wherein the cooling structure and the control circuit attach to the umbrella structure;
wherein the solar umbrella forms a temporary shelter;
wherein the solar umbrella creates a protected space;
wherein the umbrella structure forms the protected space;
wherein the cooling structure generates an air flow within the protected space;
wherein the control circuit provides electrical energy used to operate the cooling structure;
wherein the control circuit comprises a power output circuit, a master switch, and a power circuit;
wherein the power output circuit, the master switch, and the power circuit are electrically interconnected;
wherein the power circuit powers the operation of the control circuit;
wherein the power output circuit provides a port that presents an electric voltage suitable for use in powering and charging an externally provided electrically powered device;
wherein the power output circuit forms a series electric circuit with the power circuit;
wherein the master switch is wired in series with the fan such that the master switch controls the flow of electric energy from the power circuit into the fan;
wherein the circuit formed by the combination of the master switch and the fan forms a parallel circuit with the power output circuit;
wherein the umbrella structure is a mechanical structure;
wherein the umbrella structure forms a protected space;
wherein the umbrella structure forms a barrier that encloses the superior boundary of the protected space;
wherein the umbrella structure is a collapsible structure;
wherein the control circuit is an electric circuit;
wherein the control circuit provides the electric energy necessary to operate the cooling structure;
wherein the control circuit provides the electric energy used to an additional electrically powered device;
wherein the control circuit is an independently powered electric circuit;
wherein by independently powered is meant that the control circuit can provide electric energy to operate the cooling structure and the externally provided electrically powered devices without an electrical connection to an external power source;
wherein the cooling structure is an electromechanical device;
wherein the cooling structure is an electrically powered device;
wherein the cooling structure electrically connects to the control circuit;
wherein the cooling structure draws electric energy for operation from the control circuit;
wherein the cooling structure generates an air flow through the protected space formed by the umbrella structure;
a center rod, a canopy, and a plurality of ribs;
wherein the center rod elevates the canopy and the plurality of ribs;
wherein the cooling structure comprises a fan and a fan clip;
wherein the fan clip removably attaches the fan to the center rod of the umbrella structure;
wherein the power circuit is an electrical circuit;
wherein the power circuit is an electrochemical device;
wherein the power circuit converts chemical potential energy into the electrical energy required to power the control circuit;
wherein the power output circuit is an electric circuit;
wherein the master switch is an electric switch;
wherein the master switch is a maintained switch.

2. The solar umbrella according to claim 1
wherein the power circuit comprises a battery, a diode, and a photovoltaic cell;
wherein the battery, the diode, and the photovoltaic cell are electrically interconnected;
wherein the battery further comprises a first positive terminal and a first negative terminal;
wherein the photovoltaic cell further comprises a second positive terminal and a second negative terminal.

3. The solar umbrella according to claim 2
wherein the center rod is an extension structure;
wherein the center rod anchors the canopy and the plurality of ribs.

4. The solar umbrella according to claim 3
wherein the center rod comprises a stanchion and a stake;
wherein the stanchion attaches to the stake to form a composite structure;
wherein the stanchion forms the extension structure that elevates the canopy of the umbrella structure above the ground in which the stake anchors the umbrella structure;
wherein the stake is a spit shaped structure;
wherein the stake is driven into the ground to anchor the umbrella structure into a fixed position.

5. The solar umbrella according to claim 4
wherein the canopy is a sheeting structure;
wherein the canopy forms the superior barrier of the protected space formed by the umbrella structure.

6. The solar umbrella according to claim 5
wherein the canopy forms a fluid impermeable barrier;
wherein the canopy forms an opaque barrier;
wherein the canopy forms the surface on which the photovoltaic cell of the control circuit attaches;
wherein the photovoltaic cell mounts on the superior surface of the canopy.

7. The solar umbrella according to claim 6
wherein the plurality of ribs form a load bearing structure;
wherein each of the plurality of ribs attaches to the stanchion of the center rod;
wherein each of the plurality of ribs attaches to the stanchion such that the plurality of ribs rotates between an open position and a closed position;
wherein the plurality of ribs attaches the canopy to the center rod such that the canopy also rotates between an open position and a closed position;
wherein the plurality of ribs collapses into the closed position to prepare the umbrella structure for storage;
wherein the plurality of ribs deploys into the open position to create the protected space formed by the umbrella structure.

8. The solar umbrella according to claim 7
wherein the power output circuit comprises a limit resistor, a Zener diode, and an output port;
wherein the limit resistor, the Zener diode, and the output port are electrically interconnected;
wherein the limit resistor is an electric circuit element;
wherein the limit resistor limits the flow of electricity through the Zener diode;
wherein the Zener diode is an electric circuit element;
wherein the Zener diode presents a relatively constant voltage, known as a Zener voltage, to the output port;
wherein the output port is an electric port;
wherein the output port presents as its output voltage the Zener voltage of the Zener diode;
wherein the output port transmits the electric energy received from the power circuit to the externally provided electrically powered device.

9. The solar umbrella according to claim 8
wherein the battery is a rechargeable battery;
wherein the photovoltaic cell is an electrical device that converts light into electrical energy;
wherein the photovoltaic cell is directly wired to the battery;
wherein the photovoltaic cell is an electrical circuit that reverses the polarity of the rechargeable battery;
wherein the diode is an electrical device that allows current to flow in only one direction;
wherein the diode installs between the rechargeable battery and the photovoltaic cell such that electricity will not flow from the first positive terminal of the rechargeable battery into the second positive terminal of the photovoltaic cell.

10. The solar umbrella according to claim 9
wherein the fan is an electrically powered device;
wherein the fan physically generates the air flow through the protected space formed by the umbrella structure.

11. The solar umbrella according to claim 10
wherein the fan clip is a mechanical structure;
wherein the fan clip is a spring loaded structure;
wherein the fan clip removably attaches the fan to the stanchion of the center rod of the umbrella structure.

12. The solar umbrella according to claim 11
wherein the fan clip further comprises a universal joint;
wherein the universal joint is a locking universal joint;
wherein the universal joint physically attaches the fan to the fan clip such that the fan rotates relative to the stanchion of the center rod;
wherein the universal joint allows for the adjustment of the direction of the air flow through the protected space formed by the umbrella structure.

* * * * *